(12) United States Patent
Daigneault

(10) Patent No.: US 6,609,865 B2
(45) Date of Patent: Aug. 26, 2003

(54) COLOR PRESSURE-SENSITIVE FASTENER

(75) Inventor: Louis E. Daigneault, Montreal (CA)

(73) Assignee: Ipex Inc., Don Mills (CA)

( * ) Notice: Subject to any disclaimer, the term of this patent is extended or adjusted under 35 U.S.C. 154(b) by 0 days.

(21) Appl. No.: 10/128,289

(22) Filed: Apr. 24, 2002

(65) Prior Publication Data

US 2003/0116972 A1 Jun. 26, 2003

(51) Int. Cl.[7] .................................................. F16B 3/02
(52) U.S. Cl. .......................... 411/13; 411/14; 411/361; 411/517; 116/DIG. 34; 73/762
(58) Field of Search ............... 411/13, 14, 361, 411/517, 521; 116/212, DIG. 34; 73/762

(56) References Cited

U.S. PATENT DOCUMENTS

| | | |
|---|---|---|
| 3,896,965 A | 7/1975 | Cornell |
| 3,918,160 A | 11/1975 | Friedman |
| 3,935,960 A | 2/1976 | Cornell |
| 3,948,141 A | 4/1976 | Shinjo |
| 4,015,465 A | 4/1977 | Scott |
| 4,170,163 A * | 10/1979 | Payne .......................... 411/14 |
| 5,242,830 A | 9/1993 | Argy et al. |
| 5,325,721 A | 7/1994 | Pendergrass, Jr. |
| 5,641,167 A | 6/1997 | Behm et al. |
| 5,732,721 A | 3/1998 | Pelok |
| 5,918,262 A | 6/1999 | Sanford |

FOREIGN PATENT DOCUMENTS

| | | | |
|---|---|---|---|
| DE | 3148730 | * 7/1983 | ................... 411/13 |
| GB | 1183683 | * 3/1970 | ................... 411/13 |
| JP | 52-6862 | * 1/1977 | ................... 411/13 |

OTHER PUBLICATIONS

PEX Crimp Fittings.

* cited by examiner

*Primary Examiner*—Neill Wilson
(74) *Attorney, Agent, or Firm*—Riches, McKenzie & Herbert LLP

(57) ABSTRACT

A color pressure-sensitive fastener capable of providing a visual indication of a pressure threshold applied to the fastener is disclosed. The fastener includes a fastening portion which is actuated to fasten by way of application of a sufficient actuating pressure on an actuating surface of the fastening portion; and a pressure-sensitive substance associated with the actuating surface such that the actuating surface visibly changes color after the sufficient actuating pressure is applied to the actuating surface. This invention at least partially overcomes some of the disadvantages of typical fasteners, such as the lack of visual indication of proper installation of the fastener.

11 Claims, 1 Drawing Sheet

COLOR PRESSURE-SENSITIVE FASTENER

FIELD OF THE INVENTION

This invention relates to a fastener and, in particular, a pressure-indicating fastener capable of providing a visual indication of a pressure threshold applied to the fastener.

BACKGROUND OF THE INVENTION

In the past, there have been many different types of fastening devices used to join at least two different elements. Typically, these fastening devices involve the application of pressure to accomplish the fastening. By way of example, a non-exhaustive list of such devices include clamps, crimp rings, nut-and-bolt combinations, rivets, screws, straps, etc.

Typically, installation of such fastening devices requires a minimum application of pressure to ensure that fastening has been properly effected. In some applications, special tools, such as a torque wrench in the installation of a nut-and-bolt fastener, are used to indicate the amount of force applied to the fastener. In the instance of the torque wrench, other than the applied pressure being indicated by the torque wrench, there is no positive indication that the nut and bolt are installed with the correct pressure. Further, a visual inspection of the installed fastener would not reveal improper installation.

In another situation, when large plumbing systems are installed, there may be dozens of crimp rings that are applied to tube/fitting assemblies that are assembled prior to a contractor crimping the various assemblies. The contractor might forget to crimp a ring and an inspector may not catch the missed crimp ring. If the construction proceeds, the assembly may prematurely fail and cause damage to the completed unit. For example, long after an improperly installed piping joint has been covered up, it could involve considerable additional expense to repair given the difficulty of accessing the joint. Consequently, it is important that there be an easy and reliable indicator of the fact that the crimp ring has been or has not been properly crimped.

SUMMARY OF THE INVENTION

Accordingly, it is an object of this invention to at least partially overcome the disadvantages of the prior art. Thus, it is an object of this invention to provide an improved type of fastener which is capable of providing a visual indication of a pressure threshold applied to the fastener.

Accordingly, in one of its aspects, this invention resides in a fastener comprising a fastening portion which is actuated to fasten by way of application of a sufficient actuating pressure on an actuating surface of the fastening portion; and a pressure-sensitive substance associated with at least part of the actuating surface such that the actuating surface visibly changes colour after the sufficient actuating pressure is applied to the actuating surface.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
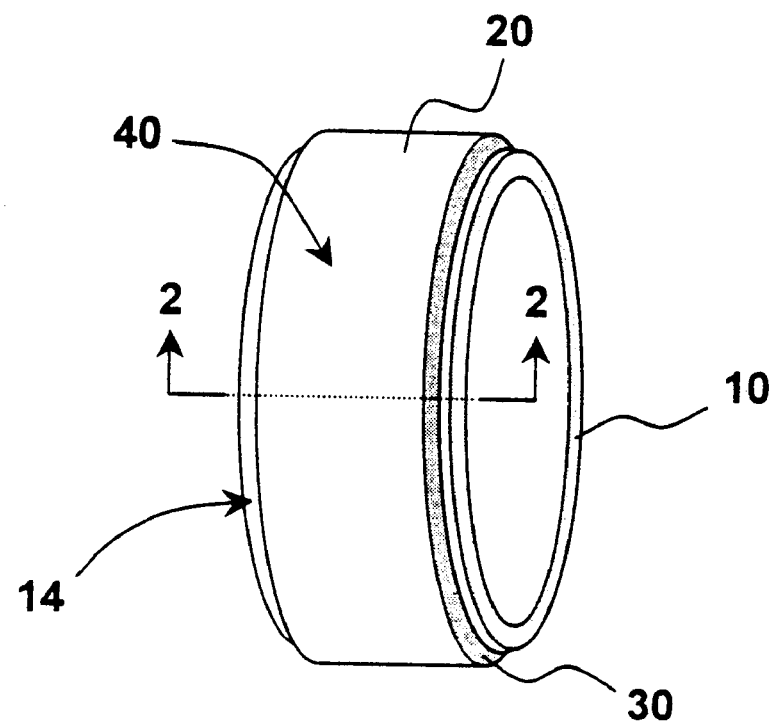
FIG. 1 is a perspective view of a crimp ring fastener partially covered with a pressure-sensitive substance.

As shown in FIG. 1, one embodiment of the present invention relates to a fastener comprising a crimp ring 10 having an actuating surface 40 partially or wholly covered with a pressure-sensitive substance 20. The actuating surface 40 is the surface at which a crimping tool comes into contact with the fastener. In one embodiment, the crimp ring 10 is the fastening portion of the fastener, and it is also the deformable portion of the fastener.

Figure 2:
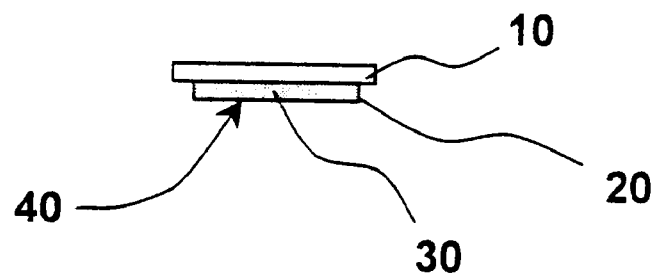
FIG. 2 is a partial cross-sectional view along line 2—2 as shown in FIG. 1.

The pressure-sensitive substance 20 may be any pressure-sensitive substance that visibly changes colour after sufficient pressure is applied to the pressure-sensitive substance 20 during installation of the crimp ring 10. In a preferred embodiment, the pressure-sensitive substance 20 contains frangible microspheres within a matrix 30 of the pressure-sensitive substance 20 that break upon application of sufficient pressure to the actuating surface 40, as shown in FIG. 2. The fluid released from the broken microspheres can be a gas or, more preferably, a liquid that results in the pressure-sensitive substance 20 visibly changing colour. The released fluid can be a coloured dye different from the colour of the pressure-sensitive substance 20, or can be a fluid with a dying ability that changes the colour of the pressure-sensitive substance 20 once in direct contact with the matrix 30 of the pressure-sensitive substance 20. In the former alternative, it may be advantageous that the released fluid be a liquid which would at least partially remain on the actuating surface 40. In the latter alternative, it may be advantageous that the fluid be a gas which could permeate more effectively through the matrix 30.

For the purposes of this invention, white is considered a colour.

It will be readily understood that the pressure-sensitive substance 20 need not fully cover the surface of the crimp ring 10, nor be placed wholly on the outer surface 14 of the crimp ring 10, as shown in FIG. 1. In alternative embodiments, the pressure-sensitive substance 20 can cover the entire crimp ring 10.

The application of the pressure-sensitive substance 20 can be by way of a paint or a tape, but is not so limited.

In a preferred embodiment, the frangible microspheres break upon application of pressures in the range of $5 \times 10^6$ to $1 \times 10^8$ Pascals, a pressure range commonly necessary for proper installation of a copper crimp ring in commercial or industrial applications.

Although a preferred embodiment of the colour pressure-sensitive fastener is a crimp ring 10 fabricated from copper, it is within the scope of the invention that the crimp ring 10 can be selectively fabricated from other suitably deformable metals or composite materials. Similarly, it is understood that the present invention is not limited to employing a crimp ring 10 as the fastener type, but rather the invention can be employed with any fastener type which uses pressure as a means to fasten.

Once sufficient pressure has been applied to the actuating surface 40 to result in the colour change associated with the pressure-sensitive substance 20, there is a positive visual indication that the crimp ring 10 has been properly installed.

It will be understood that the pressure applied to the actuating surface 40 by a crimping tool, and hence to the pressure-sensitive substance 20, may not correspond to the pressure applied to the crimp ring 10, depending on such factors as the deformation characteristics of the pressure-sensitive substance 20, and the location of the pressure-sensitive substance 20 with respect to the actuating surface 40. Accordingly the pressure-sensitive substance 20 may be required to indicate a pressure above or below that required for proper installation of the crimp ring 10, and hence proper operation of the colour pressure-sensitive fastener.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments to the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A crimp ring comprising:
   a fastening portion which is actuated to fasten by way of application of a sufficient actuating pressure on an actuating surface of the fastening portion; and
   a pressure-sensitive substance associated with the actuating surface such that at least part of the crimp ring visibly changes colour after the sufficient actuating pressure is applied to the actuating surface,
   wherein the actuating surface visibly changes colour after the sufficient actuating pressure is applied to the actuating surface, and
   wherein the fastening portion is a deformable ring portion.

2. A crimp ring as defined in claim 1 wherein the pressure-sensitive substance is a paint applied to at least part of the actuating surface.

3. A crimp ring as defined in claim 1 or 2 wherein the pressure-sensitive substance is a tape applied to at least part of the actuating surface.

4. A crimp ring as defined in claim 1 or 2 wherein the pressure-sensitive substance contains capsules that break when the sufficient actuating pressure is applied against the capsules thereby releasing a coloured fluid or a fluid with a dying ability.

5. A crimp ring as defined in claim 4 wherein at least some of the fluid from capsules that have been broken remains on the actuating surface after the sufficient actuating pressure is applied to the actuating surface.

6. A crimp ring as defined in claim 4 wherein the actuating surface has colour and the fluid is of a colour that is visibly different than the colour of the actuating surface.

7. A crimp ring as defined in claim 4 wherein the actuating surface has colour and the fluid with a dying ability visibly alters the colour of the actuating surface.

8. A crimp ring as defined in claim 4 wherein the fluid is a liquid.

9. A crimp ring as defined in claim 4 wherein the fluid is a gas.

10. A crimp ring as defined in claim 4 wherein the capsules are frangible microspheres.

11. A crimp ring as defined in claim 4 wherein the sufficient actuating pressure is greater than $5 \times 10^6$ Pascals.

* * * * *